(12) United States Patent
Spooler (10) Patent No.: US 8,522,402 B1
(45) Date of Patent: Sep. 3, 2013

(54) CARGO STRAP COLLECTOR

(71) Applicant: James D. Spooler, Chaffee, MO (US)

(72) Inventor: James D. Spooler, Chaffee, MO (US)

(*) Notice: Subject to any disclaimer, the term of this patent is extended or adjusted under 35 U.S.C. 154(b) by 0 days.

(21) Appl. No.: 13/711,027

(22) Filed: Dec. 11, 2012

(51) Int. Cl.
*B60P 7/08* (2006.01)
*A44B 11/00* (2006.01)

(52) U.S. Cl.
USPC .......... 24/69 CT; 24/68 E; 24/132 R; 24/133; 24/170; 24/191; 24/489; 24/517

(58) Field of Classification Search
USPC ......... 24/69 ST, 69 CF, 70 ST, 71 ST, 71 TD, 24/68 E, 170, 191, 132 R, 133, 489, 494, 24/498, 517
See application file for complete search history.

(56) References Cited

U.S. PATENT DOCUMENTS

| | | | | |
|---|---|---|---|---|
| 5,560,086 A * | 10/1996 | Huang | | 24/68 CD |
| 5,572,771 A * | 11/1996 | Kelleghan | | 24/170 |
| 5,611,520 A | 3/1997 | Soderstrom | | |
| 5,778,496 A * | 7/1998 | Huang | | 24/68 CD |
| 5,806,145 A * | 9/1998 | Chen | | 24/170 |
| 5,894,638 A * | 4/1999 | Huang | | 24/68 CD |
| 5,920,963 A * | 7/1999 | Chou | | 24/170 |
| 6,102,371 A | 8/2000 | Wyers | | |
| 6,547,218 B2 * | 4/2003 | Landy | | 254/217 |
| 6,665,913 B2 * | 12/2003 | Kosh et al. | | 24/193 |
| 6,735,826 B2 * | 5/2004 | Uehara et al. | | 24/170 |
| 6,868,587 B2 * | 3/2005 | Rard | | 24/170 |
| 7,100,901 B2 | 9/2006 | Gleinser | | |
| 7,100,902 B1 | 9/2006 | Lu | | |
| 7,107,655 B1 * | 9/2006 | Huang | | 24/68 CD |
| 7,171,731 B1 | 2/2007 | Borcherding | | |
| 7,334,301 B2 * | 2/2008 | Huang | | 24/170 |
| 7,444,720 B2 * | 11/2008 | Huang | | 24/170 |
| 7,503,736 B1 * | 3/2009 | Chen | | 410/100 |
| 7,506,413 B2 * | 3/2009 | Dingman et al. | | 24/170 |
| 7,681,286 B1 | 3/2010 | Lewis et al. | | |
| 7,789,603 B2 * | 9/2010 | Huck | | 410/100 |
| 7,861,382 B1 | 1/2011 | Madachy et al. | | |
| 7,877,846 B1 | 2/2011 | Chen | | |
| 2001/0045548 A1 * | 11/2001 | Landy | | 254/217 |
| 2003/0019080 A1 * | 1/2003 | Anthony et al. | | 24/68 R |
| 2003/0037417 A1 * | 2/2003 | Shen et al. | | 24/334 |
| 2005/0125961 A1 * | 6/2005 | Pontaoe | | 24/170 |
| 2007/0193004 A1 * | 8/2007 | Chou | | 24/170 |
| 2008/0010786 A1 * | 1/2008 | Huang | | 24/170 |
| 2008/0148529 A1 * | 6/2008 | Huang | | 24/170 |
| 2010/0247265 A1 | 9/2010 | Jensen | | |
| 2011/0209314 A1 * | 9/2011 | Miller | | 24/68 CD |
| 2011/0209315 A1 * | 9/2011 | Miller | | 24/68 CD |

* cited by examiner

*Primary Examiner* — Robert J Sandy
*Assistant Examiner* — David Upchurch
(74) *Attorney, Agent, or Firm* — Grace J. Fishel (57) ABSTRACT

A separately operating cargo strap collector for use with a ratchet-buckle assembly of known construction having longer and shorter straps and a ratchet-buckle. The strap collector includes sidewalls connected to upper and lower walls forming a channel through which the longer strap passes with a clamp in the channel for attaching the strap collector to the longer strap. The sidewalls and upper wall forming a magazine for folds of excess longer strap after the longer strap is tightened by the ratchet-buckle. A pair of lever arms are journaled in the sidewalls with a finger for clamping the folds of excess strap against the bottom wall of the magazine.

11 Claims, 7 Drawing Sheets

CARGO STRAP COLLECTOR

BACKGROUND OF THE INVENTION

1. Field of the Invention

The present invention relates to a strap collector for use in combination with a ratchet-buckle assembly of known construction including a longer strap and a ratchet-buckle. The strap collector secures the loose end of the longer strap during transport of a load and can be used as a storage device for the longer strap when the ratchet-buckle assembly is not in use.

2. Brief Description of the Prior Art

Ratchet-buckle assemblies for securing a load on a flat bed trailer, railroad flat car and the like are well known. Such assemblies include a short length of strap with a ratchet-buckle attached and a longer strap. The short strap with the ratchet buckle is secured, usually by means of a hook, to one side of the load platform. The longer strap is likewise attached to the opposite side of the platform and passed over the load to be secured. A free end of the longer strap is inserted into the ratchet-buckle assembly and the slack taken up as far as possible.

Practicality makes it desirable that one ratchet-buckle assembly be suitable for a range of loads and the longer strap must be of great length to accommodate large loads. Thus when it is used to secure a smaller load, a long length of the longer strap will be left free and must be secured. If it is left flapping, it can cause damage to the strap itself or the secured load, or to passing vehicles. This is particularly a problem in connection with the 25 to 30 foot long straps used professionally which may wind around the wheels, breaking the assembly and releasing the load.

One way to secure the excess strap is to tuck it into the load but there is a risk that it may come lose. To address that risk, there are a number of devices proposed that attach to the ratchet-buckle device and include a storage spool onto which the free end of the longer strap is spooled. Whether the spool is positioned in the plane of the ratchet-buckle or perpendicular to the ratchet-buckle, there is a limited amount of space which limits the length of strap that can be spooled. Hence there remains a need for a strap collector separate from the ratchet-buckle that can secure the free end of the longer strap, whether long or short in length.

Another problem with existing ratchet-buckle assemblies is in storing the long strap when the assembly is not in use. Sometimes the long strap is left lying around where it may get in the way of workers or tangled in other equipment. In addition to being a safety risk, the long strap may also become soiled with dirt, oil, water, etc. which is undesirable and may represent a further safety risk. It would therefore be desirable if the same strap collector could also facilitate storage of the longer strap when the assembly was not in use.

BRIEF SUMMARY OF THE INVENTION

In view of the above, it is an object of the present invention to provide a strap collector for the end of the longer strap of a ratchet-buckle assembly during transport of a load. It is another object to provide a strap collector that can be used to store the longer strap when the ratchet-buckle assembly is not in use. It is also an object to provide a strap collector that can be used with existing ratchet-buckle assemblies and does not interfere with their operation. Other objects and features of the invention will be in part apparent and in part pointed out hereinafter.

As disclosed, a strap collector separate from a ratchet-buckle assembly for tightening the strap, in major part, has sidewalls which are connected perpendicularly to a common bottom portion having upper and lower spaced apart bottom walls. The upper and lower spaced apart bottom walls form a channel through which a free end of the strap may be passed while the sidewalls and the upper wall form a magazine for receipt of folded excess strap.

A clamp is provided in the channel for attaching the strap collector to the strap and a pair of lever arms are journaled in the sidewalls with a depending finger for clamping the excess strap in folds against the bottom wall of the magazine.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Referring to the drawings more particularly by reference character, a cargo strap collector 10 in accordance with the present invention is shown in use on a ratchet-buckle assembly 12 of well known construction. Ratchet-buckle assembly 12 includes a shorter strap 14 to which a ratchet-buckle 16 is attached and a longer strap 18 which is passed over a load 20 on a platform 22 of a trailer, railroad flat car or the like. Shorter strap 14 is secured by means of a hook 24 to one side of platform 22 and longer strap 18 is likewise attached to the opposite side of platform 22. Longer strap 18 may be of considerable length, for example in the order of 25 to 30 feet. Ratchet-buckle 16 includes a ratchet handle 26 and a body 30 that supports a ratchet wheel assembly on a shaft. Back and forth movement of ratchet handle 26 causes a free end 32 of longer strap 18 to be pulled through ratchet-buckle 16 and longer strap 18 to tighten down over load 20.

Figures 5, 6:
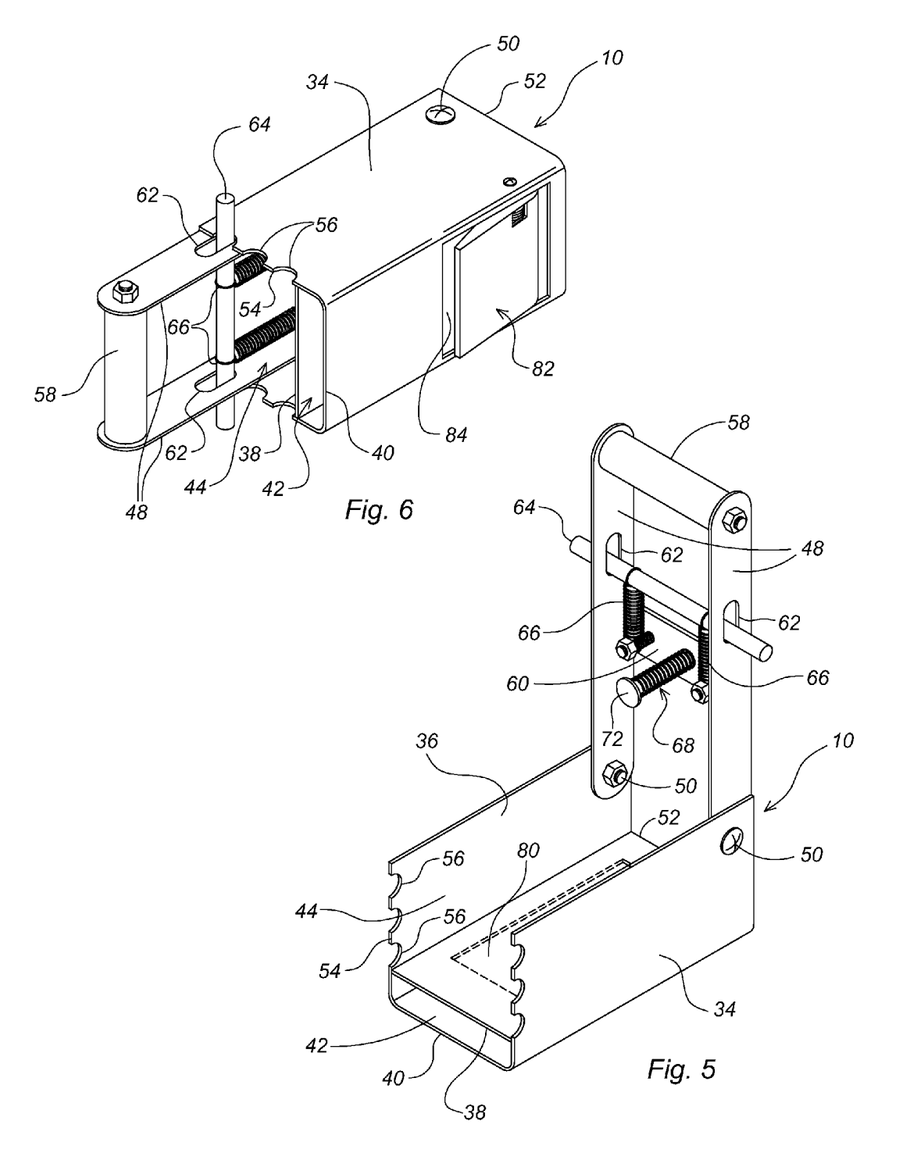
FIG. 5 is a perspective view of the strap collector showing the lever arms open.
FIG. 6 is a bottom perspective view of the strap collector showing a spring clamp for attaching the strap collector to the longer strap of a ratchet-buckle assembly.

Cargo strap collector 10 is separate from ratchet-buckle assembly 12 and may be attached to longer strap 18 of any existing ratchet-buckle assembly without affecting the operation of ratchet-buckle assembly in any respect. In major part, cargo strap collector 10 includes a pair of opposing sidewalls 34, 36 which are connected perpendicularly to a common bottom portion including upper and lower 38, 40 spaced apart bottom walls respectively. Upper and lower bottom walls 38, 40 form a channel 42 (FIGS. 5 and 6) through which free end 32 of longer strap 18 may be passed. Sidewalls 34, 36 are spaced apart a distance about the width of longer strap 18 such sidewalls 34, 36 with upper bottom wall 38 form a magazine 44 (FIGS. 5 and 6) for receipt of folds 46 of longer strap 18.

A pair of lever arms 48 are journaled in sidewalls 34, 36 about pivot studs 50 toward a rear end 52 of bottom portion. As illustrated, lever arms 48 are on the inside of sidewalls 34, 36 but as will be apparent to those skilled in the art may be on the outside. Lever arms 48 may extend beyond a front end 54 of bottom portion to amplify the compressive force applied by lever arms 48 on folds 46.

A plurality of aligned detents 56 are provided on a front edge of sidewalls 35, 36 near front end 54 of bottom position. Lever arms 48 are joined together at a forward end with a handle 58 and with a crossmember 60 along the length thereof. A pair of aligned, elongated holes 62 are provided in lever arms 48 forward of crossmember 60 through which a rod 64 is fitted for selected receipt in aligned detents 56. A resilient member such as a pair of extension springs 66 connects crossmember 60 with rod 64 for tensioning the rod in detents 56. The spacing between handle 58 and rod 64 is such that rod 64 may be moved between detents 56 by an operator placing his palm on handle 58 and with his fingers around rod 64 squeezing against the tension applied by the resilient member.

Figure 4:
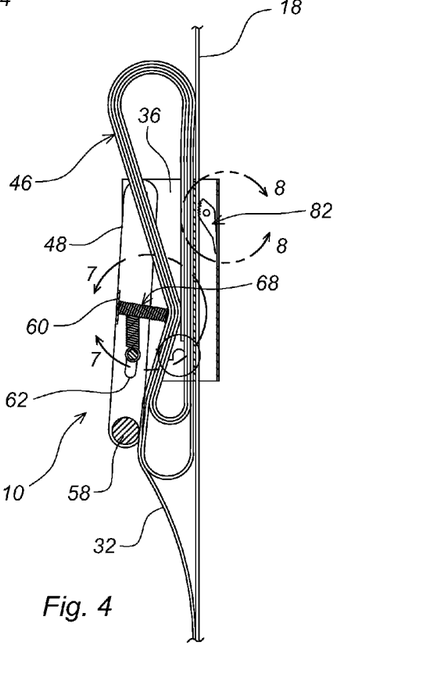
FIG. 4 is a section taken along the plane of 4-4 in FIG. 3.
Figure 7:
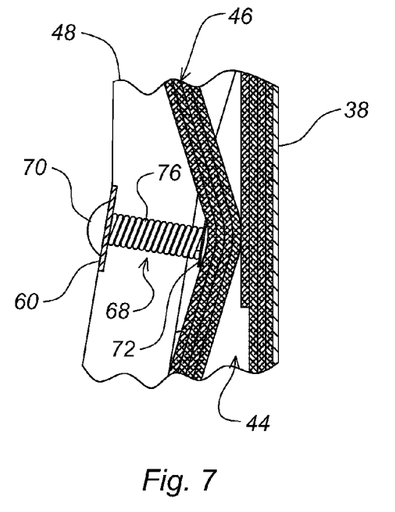
FIG. 7 is an enlarged view taken along the plane of 7-7 in FIG. 4 showing the strap held place by a spring biased finger.
Figure 7A:
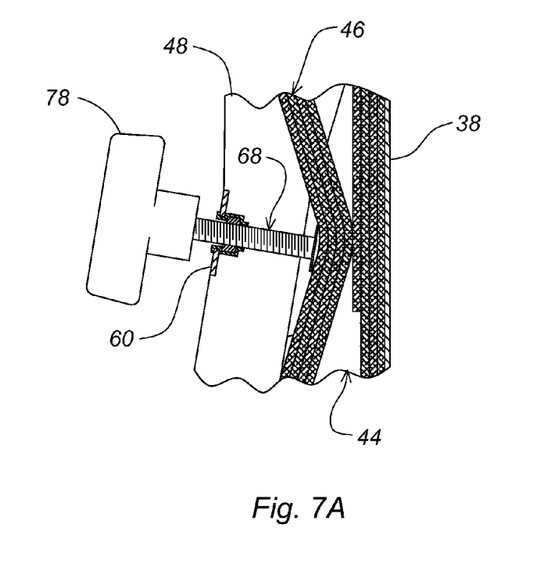
FIG. 7A is an enlarged view of an alternate means of clamping the strap in the strap collector.

A depending finger 68 is attached to crossmember 60. In the form shown in FIGS. 4-5, finger 68 is a rod held captive between upper and lower stops 70, 72 (FIG. 7), respectively, in an aperture provided in crossmember 60. A compression spring 76 is threaded over rod 68 between crossmember 60 and lower stop 72 for applying pressure to folds 46 of longer strap 18 received in magazine 44. As shown in FIG. 7A, rod 68 may be threaded with a handle 78 attached to an upper end of rod 68 to thread rod 68 up and down in crossmember 60 for applying pressure to folds 46. An upper surface of upper bottom wall 38 may be roughened or otherwise non-smooth to keep folds 46 of the strap from sliding in magazine 44 or an aperture 80 (FIG. 5) aligned with finger 68 may be provided in upper bottom wall 38. As pressure is applied to folds 46 with finger 68, a bottom of portion of folds 46 is pressed into aperture 80 which serves as a catch to resist sliding of the folded strap in magazine 44.

Figure 8:
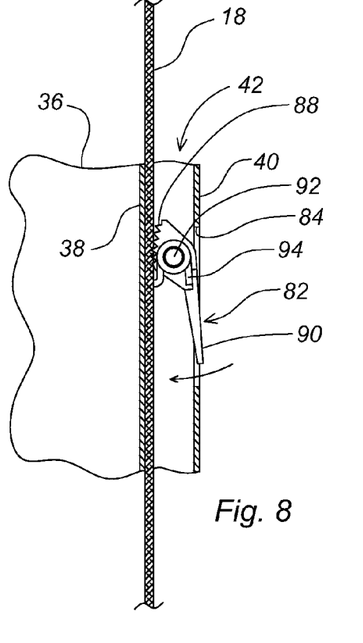
FIG. 8 is an enlarged view taken along the plane of 8-8 in FIG. 4 showing the spring clamp for attaching the strap collector to the longer strap.

A clamp 82 is provided in channel 42 for attaching cargo strap collector 10 to longer strap 18. Clamp 82 has a stationary clamping member and a movable clamping member which is accessible through an aperture 84 provided in lower bottom wall 40 of channel 42. Stationary clamping member may be the underside of upper bottom wall 38. As shown in FIG. 8, movable clamping member is a spring clamp with a gripping end 88 and a handle end 90. Spring clamp 82 is pivoted on a hinge pin 92 to a sidewall of channel 42 or to a member attached to the channel. Hinge pin 92 acts not only as a fulcrum but also serves to pivotally join together the stationary clamping member and the movable clamping member. A metal spring 94, usually a torsional helical spring or leaf spring is secured between the spring clamp 82 and the underside of upper bottom wall 38 to generate the clamping force of the spring.

Figure 8A:
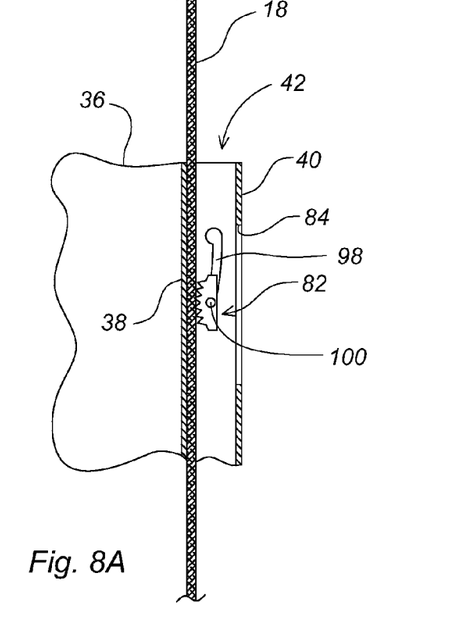
FIG. 8A is an enlarged view of a cam locking clamp for attaching the strap collector to the longer strap.
Figure 9:
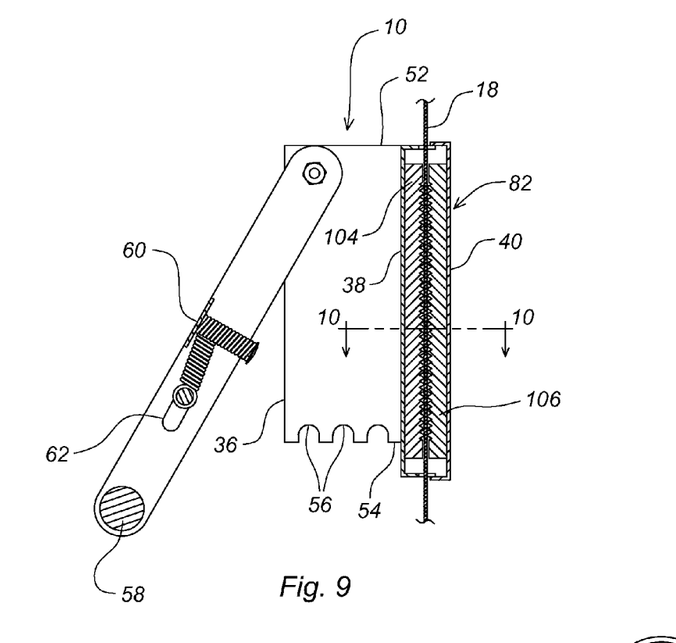
FIG. 9 is a second alternate clamp for attaching the strap collector to the longer strap.
Figure 10:
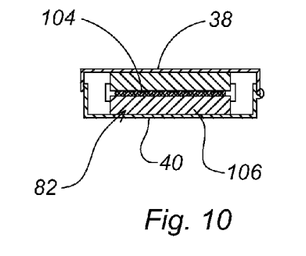
FIG. 10 is a sectional view taken along the plane of 10-10 in FIG. 9; and, FIG. 11 is a sectional view showing the longer strap wrapped around the strap collector for storage.

Clamp 82 shown in FIG. 8A is a cam locking clamp. In this instance a guide ramp 98 is securely fastened to a sidewall of channel 42 or to a member attached to the channel. Guide ramp 98 has a sliding surface along which a rod 100 with a toothed clamping surface runs for clamping longer strap 18 between rod 100 and the underside of upper bottom wall 38. In FIG. 9, clamp 82 is a pinch clamp with a stationary clamping member which may be a pad 104 attached to the underside of upper bottom wall 38 and a movable clamping member with pad 106. Stationary clamping member and movable clamping member are snap fitted with longer strap 18 clamped between pads 104, 106.

Figure 1:
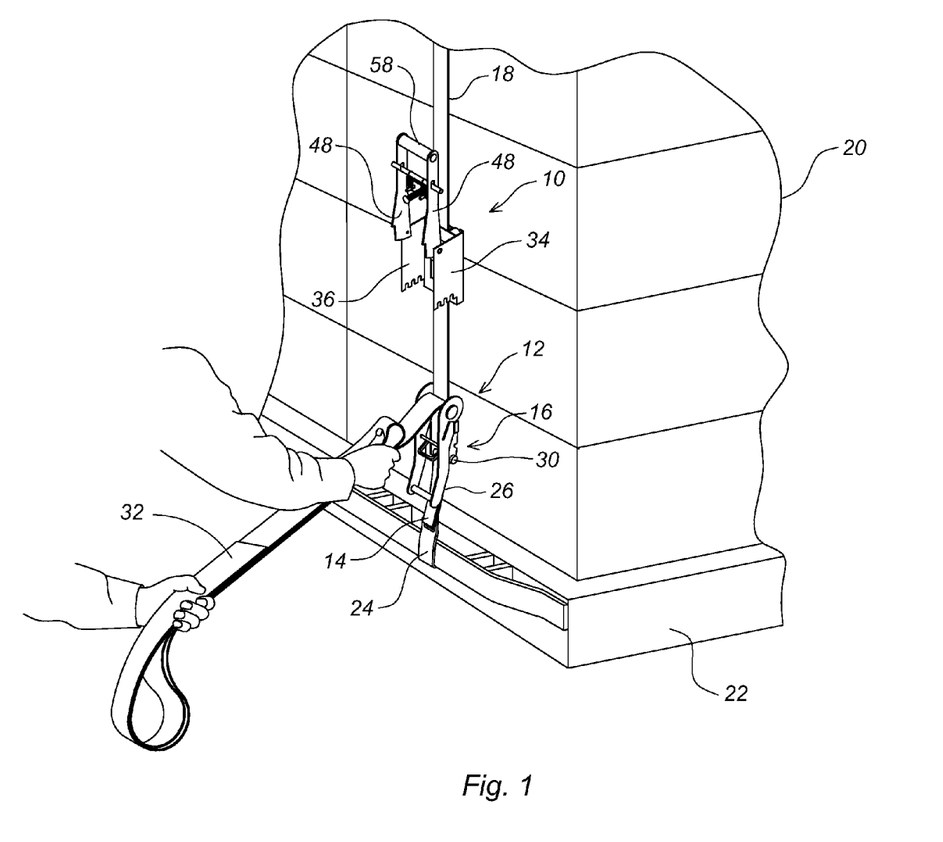
FIG. 1 is a perspective view of excess strap being gathered together for placement in a strap collector as disclosed herein.
Figure 2:
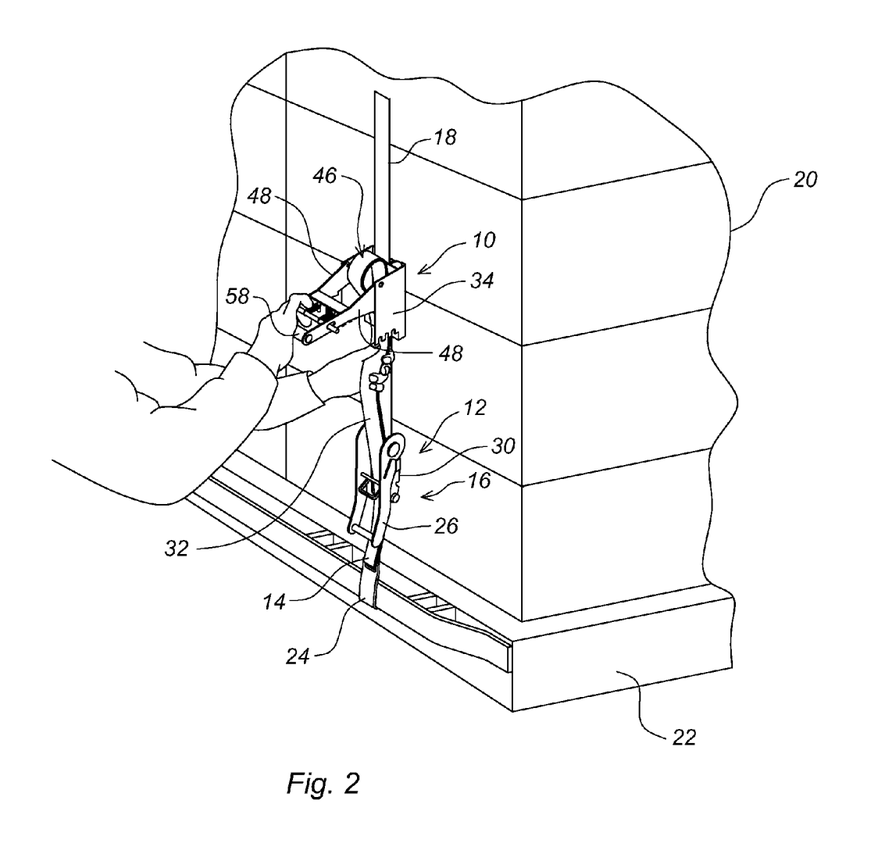
FIG. 2 is a perspective view of excess strap being placed in the strap collector.
Figure 3:
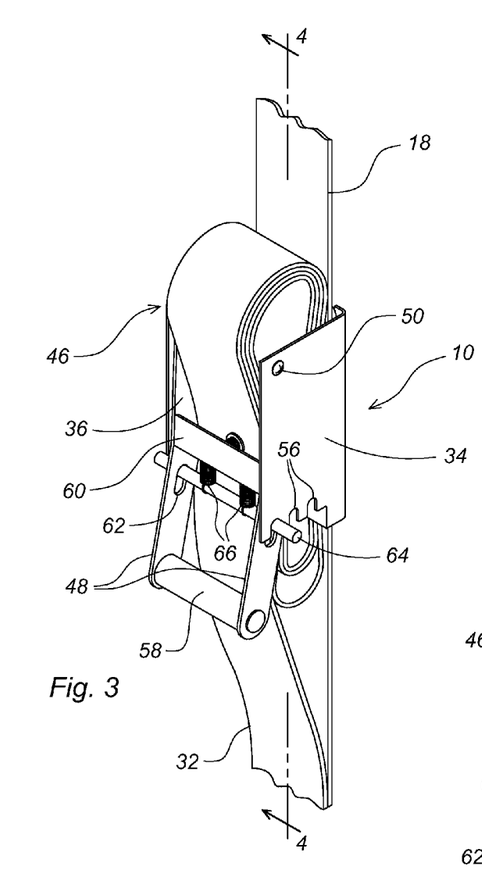
FIG. 3 is a perspective view of excess strap secured in the strap collector.

In use, longer strap 18 is attached to platform 22 and passed over load 20. Free end 32 of longer strap 18 is threaded through channel 42 of strap collector 10 and strap collector slid along longer strap 18 to a selected position above platform 22. Shorter strap 14 is attached to platform 22 and free end 32 of longer strap 18 threaded into ratchet-buckle 16. Ratchet handle 26 is worked back and forth until longer strap 18 has been tightened over load 20 to a desired extent. With lever arms 48 of strap collector 10 open as shown in FIG. 1, excess longer strap 18 is stacked in folds 46 and placed in magazine 44. Lever arms 48 are then pivoted and folds 46 compressed under finger 68. If the excess strap is longer than can be accommodated in magazine 44 by increasing the size of folds 46, strap collector 10 may be moved up on longer strap 18. If still more storage space is required, a second cargo strap collector 10 may be provided on longer strap 18. With some experience with strap collector 10, an operator will be able to decide in advance whether a second strap collector 10 will be required depending on the length of longer strap 18 and the size of load 10. With free end 32 of longer strap 18 stowed in strap collector 10, the danger that the excess strap will come loose during transport of the load is eliminated entirely or greatly reduced.

Figure 11:
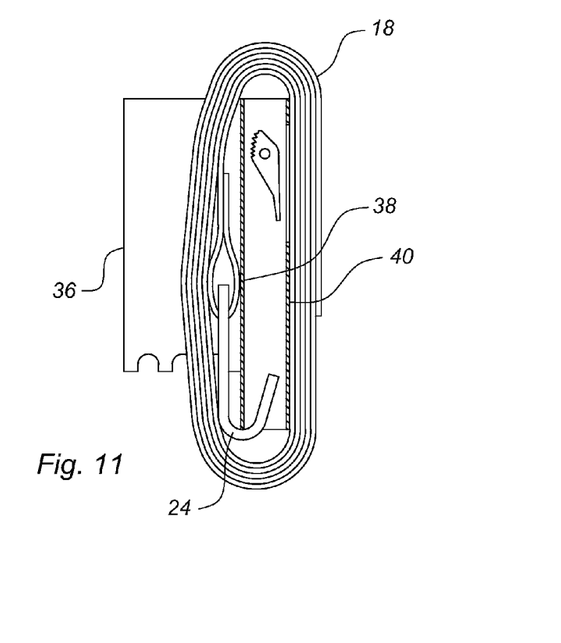

As shown in FIG. 11, strap collector 10 may be used to store longer strap 18 when ratchet-buckle assembly 12 is not in use. For this purpose, hook 24 used to attach longer strap 18 to platform 22 may be hooked into channel 42 and longer strap 18 wrapped around strap collector 10 as a spool. Longer strap 18 may be thus stowed such that it does not get in the way of workers or caught in other equipment. In addition, the strap may be kept cleaner than if it is left lying around in a tangled heap.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. A strap collector for a strap separate from a ratchet-buckle assembly for tightening the strap, said strap collector comprising sidewalls which are connected perpendicularly to a common bottom portion having upper and lower spaced apart bottom walls, said upper and lower spaced apart bottom walls forming a channel through which a free end of the strap may be passed, said sidewalls and the upper wall forming a magazine for receipt of a folded free end of the strap, a clamp in the channel for attaching the strap collector to the strap and a pair of lever arms journaled in the sidewalls with a depending finger for clamping the free end of the strap in folds against the bottom wall of the magazine, said lever arms journaled in the sidewalls towards a rear end of the bottom portion and extended beyond the front end of the bottom portion, said sidewalls having a plurality of aligned detents along a front edge of the sidewalls, said lever arms having aligned elongated holes through which a rod is fitted for selected receipt in the aligned detents and a resilient member for tensioning the rod in the aligned detents.

2. The strap collector of claim 1 wherein the lever arms are joined together at a forward end with a handle against which a user may brace his palm and wrap his fingers around the rod to move the rod between aligned detents against the tensioning force of the resilient member.

3. The strap collector of claim 1 wherein the resilient member is a pair of tensioning springs between the rod and a crossmember connecting the lever arms.

4. The strap collector of claim 1 wherein the depending finger is resiliently biased.

5. The strap collector of claim 1 wherein the depending finger has a handle and is threaded in a crossmember connecting the lever arms for applying pressure on the folds of strap in the magazine.

6. A strap collector for a strap separate from a ratchet-buckle assembly for tightening the strap, said strap collector comprising sidewalls which are connected perpendicularly to a common bottom portion having upper and lower spaced apart bottom walls, said upper and lower spaced apart bottom walls forming a channel through which a free end of the strap may be passed, said sidewalls and the upper wall forming a magazine for receipt of a folded free end of the strap, a clamp in the channel for attaching the strap collector to the strap, a pair of lever arms journaled in the sidewalls with a depending finger for clamping the free end of the strap in folds against the bottom wall of the magazine, and an aperture in the upper wall in alignment with the depending finger serving as a catch to resist movement of the folds of strap in the magazine.

7. The strap collector of claim 6 wherein the lever arms are journaled in the sidewalls towards a rear end of the bottom portion and extend beyond the front end of the bottom portion, said sidewalls having a plurality of aligned detents along a front edge of the sidewalls, said lever arms connected by a crossmember with aligned elongated holes forward of the crossmember through which a rod is fitted for selected receipt in the aligned detents and a resilient member connected between the crossmember and the rod for tensioning the rod in the aligned detents.

8. The strap collector of claim 7 wherein the lever arms are joined together at a forward end with a handle against which a user may brace his palm and wrap his fingers around the rod to move the rod between aligned detents against the tensioning force of the resilient member.

9. The strap collector of claim 7 wherein the resilient member is a pair of tensioning springs between the rod and the crossmember connecting the lever arms.

10. The strap collector of claim 7 wherein the depending finger is resiliently biased.

11. The strap collector of claim 7 wherein the depending finger has a handle and is threaded in the crossmember connecting the lever arms for applying pressure on the folds of strap in the magazine.

\* \* \* \* \*